US010395020B2

(12) United States Patent
Vissa et al.

(10) Patent No.: US 10,395,020 B2
(45) Date of Patent: Aug. 27, 2019

(54) SYSTEM AND METHOD FOR SENDING AN UNLOCK SIGNAL TO A SMART WALLET ENGAGED TO A MOBILE DEVICE

(71) Applicant: Motorola Mobility LLC, Chicago, IL (US)

(72) Inventors: Sudhir C. Vissa, Bensenville, IL (US); Vivek K. Tyagi, Chicago, IL (US); Nikhil Ambha Madhusudhana, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 167 days.

(21) Appl. No.: 15/724,690

(22) Filed: Oct. 4, 2017

(65) Prior Publication Data

US 2019/0102529 A1 Apr. 4, 2019

(51) Int. Cl.
*G06F 21/00* (2013.01)
*G06F 21/32* (2013.01)
*G06F 21/62* (2013.01)

(52) U.S. Cl.
CPC .......... *G06F 21/32* (2013.01); *G06F 21/6218* (2013.01); *G06F 2221/2147* (2013.01)

(58) Field of Classification Search
CPC ...................................................... G06F 21/32
USPC ........................................................... 726/16
See application file for complete search history.

(56) References Cited

U.S. PATENT DOCUMENTS

| 9,977,887 B2* | 5/2018 | Bengtsson .......... G06F 21/6218 |
| 2008/0173717 A1* | 7/2008 | Antebi ...................... G01S 5/22 |
| | | 235/439 |
| 2014/0207669 A1* | 7/2014 | Rosenberg ............. G06Q 20/32 |
| | | 705/41 |
| 2016/0063485 A1* | 3/2016 | Tunnell ................. H02J 7/0042 |
| 2017/0098336 A1 | 4/2017 | Ady et al. |

* cited by examiner

*Primary Examiner* — Longbit Chai
(74) *Attorney, Agent, or Firm* — Amerson Law Firm, PLLC

(57) ABSTRACT

An apparatus includes a smart wallet and a mobile device. The smart wallet includes a first body defining an enclosure, a first biometric sensor, and a first processor to unlock a portion of the first body to allow access to the enclosure responsive to validating a biometric input from the first biometric sensor. The mobile device includes a second body having an attachment interface for removably coupling to the first body and a second processor. The second processor is to send a signal to unlock the portion of the first body based on a user input on the mobile device.

20 Claims, 4 Drawing Sheets

SYSTEM AND METHOD FOR SENDING AN UNLOCK SIGNAL TO A SMART WALLET ENGAGED TO A MOBILE DEVICE

BACKGROUND

Field of the Disclosure

The disclosed subject matter relates generally to storage of personal effects for users of mobile devices, and, more particularly, to a system and method for sending an unlock signal to a smart wallet engaged to a mobile device.

Description of the Related Art

Although digitization has replaced many physical cards and keys previously needed for identification and business, certain functions still require a physical card, token or key. In addition, many users are still reluctant to fully trust the digital counterparts of many of their cards, keys and tokens, and thus hedge by carrying the physical items as a backup. These items include driver's licenses, workplace IDs, security tokens, keys and so on. In addition, many users carry cash for use when that is the only option.

Additionally, users generally wish to have a safe place to carry their cards and cash to insure they are not misplaced, and thus many store these cards in a wallet or purse, which is even more cumbersome to carry and access. Smart wallets are available that provide additional security by requiring a biometric verification (e.g., fingerprint) by the user to open the storage enclosure. However, even while providing enhanced security, a smart wallet is still an extra item that may be easily misplaced.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-5 illustrate example techniques for interfacing a mobile device with an attached smart wallet. To enhance security, biometric identification is provided on both the mobile device and the smart wallet. When the smart wallet is docked with the mobile device, the mobile device may monitor the contents of the smart wallet and control access to the storage enclosure of the smart wallet. When the smart wallet is undocked, its biometric sensor may control access to the enclosure.

Figure 1:
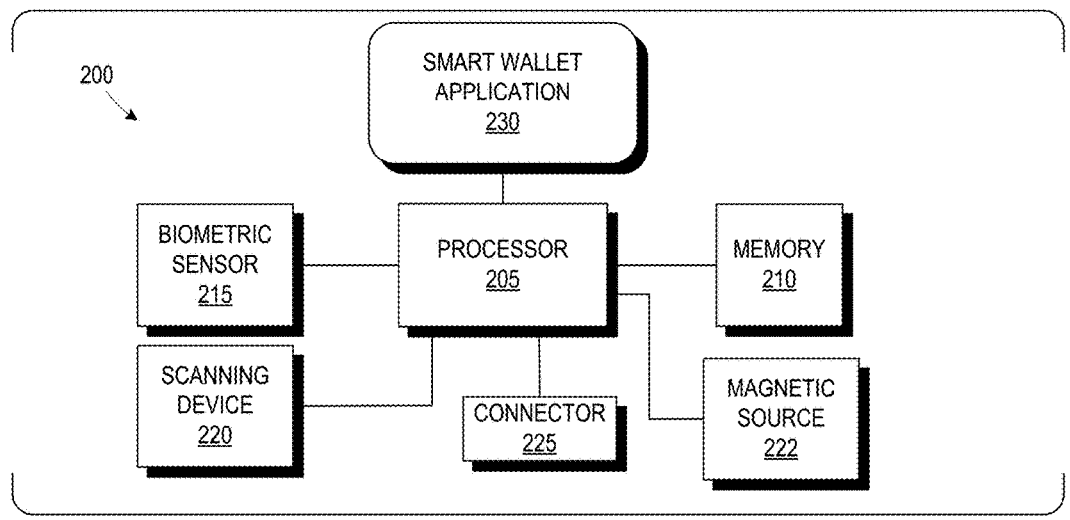
FIG. 1 is a simplified diagram of a mobile device and an interfacing smart wallet that may be controlled by the mobile device, according to some embodiments disclosed herein.
Figure 1:
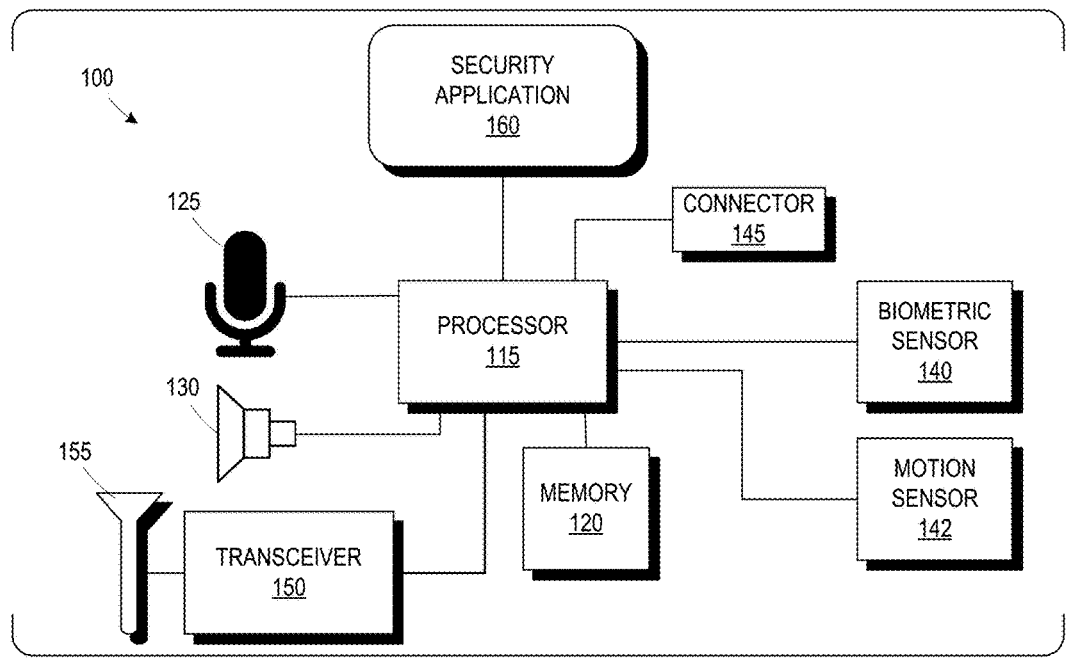

FIG. 1 is a simplistic block diagram of a mobile device 100 interfacing with a smart wallet 200, according to some embodiments disclosed herein. The mobile device 100 includes, among other things, a processor 115, a memory 120, a microphone 125, a speaker 130, a display 135, a biometric sensor 140 (e.g., fingerprint sensor, retinal scanner, etc.), a motion sensor 142 (e.g., accelerometer, magnetometer, mercury switch, gyroscope, compass or some combination thereof) and a connector 145. The memory 120 may be a volatile memory (e.g., DRAM, SRAM) or a non-volatile memory (e.g., ROM, flash memory, hard disk, etc.). The mobile device 100 also includes a transceiver 150 for transmitting and receiving signals via an antenna 155 over a communication link. The transceiver 150 may include one or more radios for communicating according to different radio access technologies, such as cellular, Wi-Fi, Bluetooth®, etc. The communication link may have a variety of forms. In some embodiments, the communication link may be a wireless radio or cellular radio link. The communication link may also communicate over a packet-based communication network, such as the Internet. The mobile device 100 may be embodied in a handheld or wearable device, such as a laptop computer, handheld computer, tablet computer, mobile telephone, personal data assistant, music player, game device, wearable computing device and the like. To the extent certain example aspects of the mobile device 100 are not described herein, such example aspects may or may not be included in various embodiments without limiting the spirit and scope of the embodiments of the present application as would be understood by one of skill in the art.

Figure 5:
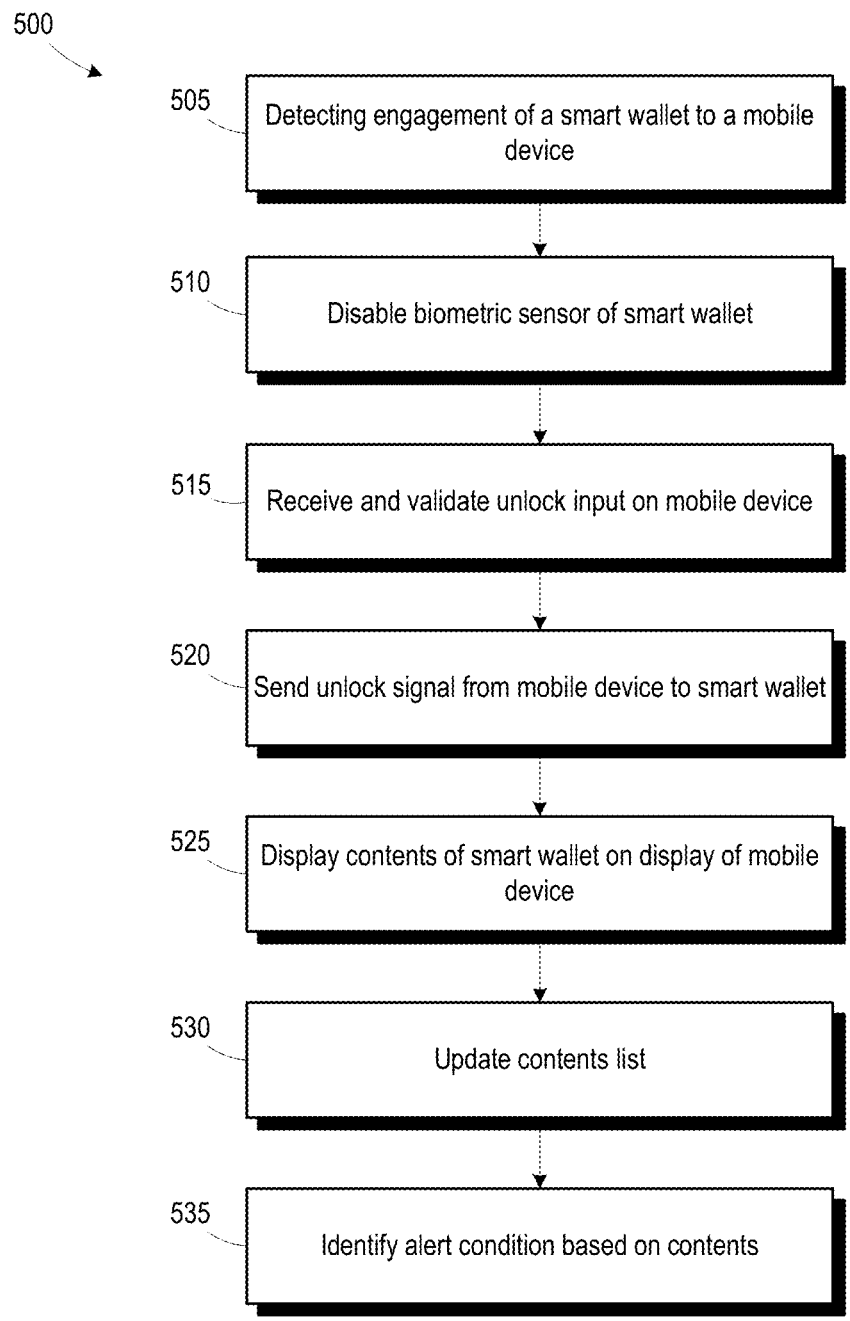
FIG. 5 is a flow diagram of a method for interfacing a mobile device with an attached smart wallet, according to some embodiments disclosed herein.

In the mobile device 100, the processor 115 may execute instructions stored in the memory 120 and store information in the memory 120, such as the results of the executed instructions. Some embodiments of the processor 115 and the memory 120 may be configured to implement a security application 160 and perform portions of a method 500 for interfacing the mobile device 100 with the attached smart wallet 200, as shown in FIG. 5 and discussed below.

The smart wallet 200 includes, among other things, a processor 205, a memory 210, a biometric sensor 215 (e.g., fingerprint sensor, retinal scanner, etc.), a scanning device 220, magnetic source 222 and a connector 225. The memory 210 may be a volatile memory (e.g., DRAM, SRAM) or a non-volatile memory (e.g., ROM, flash memory, hard disk, etc.). In the smart wallet 200, the processor 205 may execute instructions stored in the memory 210 and store information in the memory 210, such as the results of the executed instructions. Some embodiments of the processor 205 and the memory 210 may be configured to implement a smart wallet application 230 and perform portions of the method 500.

When the smart wallet 200 is undocked, the processor 205 executes the smart wallet application 230 to control access thereto via the biometric sensor 215. The scanning device 220 may be employed by the smart wallet application 230 to track the contents stored in the smart wallet 200. In some embodiments, the scanning device 220 may be an RFID reader, an NFC device, card scanning device, a camera device, etc. When a user places an item into the smart wallet 200, the scanning device 220 creates a record for the item and sends the record to the smart wallet application 230. The smart wallet application 230 maintains a list of the contents.

When the smart wallet 200 is docked with the mobile device 100, such as by the mating of the connectors 145, 225, the security application 160 detects the docking event and takes over the responsibility to control access to the enclosure of the smart wallet 200. The security application 160 may exchange information with the smart wallet application 230 to facilitate control of the smart wallet 200. The security application 160 may retrieve biometric profiles of authorized users of the smart wallet 200 from the memory 210 to allow validation by the mobile device 100. The biometric sensor 215 on the smart wallet 200 may be disabled in favor of the biometric sensor 140 on the mobile device 100. To access the control features for the smart wallet 200, a user may be directed to first provide an identity authentication via the biometric sensor 140. The retrieved biometric profiles may be used for such validation. In some embodiments, a password may be used.

A user interface of the security application 160 may display a control for accessing the smart wallet 200 and list the contents of the smart wallet 200. A user may select an item on the display 135 for removal. The security application 160 may send a signal to the smart wallet application 230 to open the enclosure of the smart wallet 200. The scanning device 220 may log the removal of the selected item to allow verification that the correct item was selected. The scanning device 220 may also detect and log the return of the item after its use and update the inventory list.

In some embodiments, the security application 160 may alert the user if the selected item is not returned within a predetermined time interval. Another alert scenario may occur when the user is driving, but a driver's license is not present on the contents list of the smart wallet 200. A driving state of the mobile device 100 may be determined using motion data from the motion sensor 142, as is known in the art. If a driving state is identified, and a license is not present, the user may be alerted. In some embodiments, an alert condition may be identified if the user reports the mobile device 100 as being stolen. Rather than emit an audio alert, the security application 160 may send a signal to the magnetic source 222 directly or through the smart wallet application 230 to activate and erase the magnetic strips on any items stored in the smart wallet 200.

Although the connectors 145, 225 are illustrated as being physical connectors in subsequent figures, in some embodiments, the connectors 145, 225 may be wireless (e.g., BLUETOOTH®). If proximity is detected, the security application 160 may supersede the smart wallet application 230. In such an embodiment, the connector 225 may actually be a transceiver that communicates with the transceiver 150 of the mobile device 100.

Figure 2:
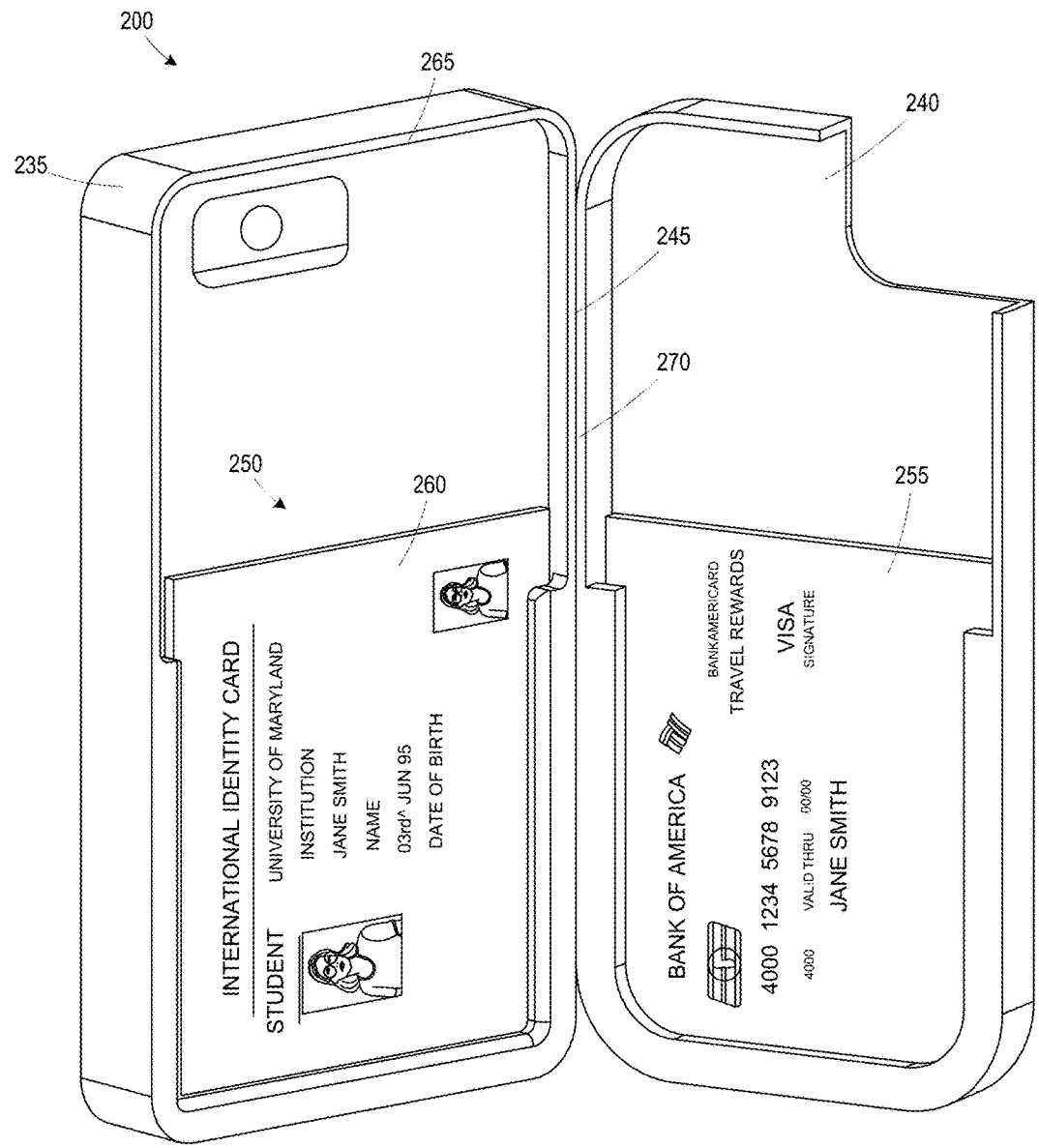
FIG. 2 is a simplified diagram of the smart wallet of FIG. 1, according to some embodiments disclosed herein.

FIG. 2 is a simplified diagram of the smart wallet of FIG. 1, according to some embodiments disclosed herein. The smart wallet 200 includes a body 235 coupled to a panel 240 (e.g., door) by a hinge 245. The panel 240 may be opened to allow access to an enclosure 250 for storing items 255, 260. The particular orientation of the panel 240 and the hinge 245 may vary. For example, the hinge 245 may be provided on a top edge 265 of the body 235 instead of the side edge 270.

Figure 3:
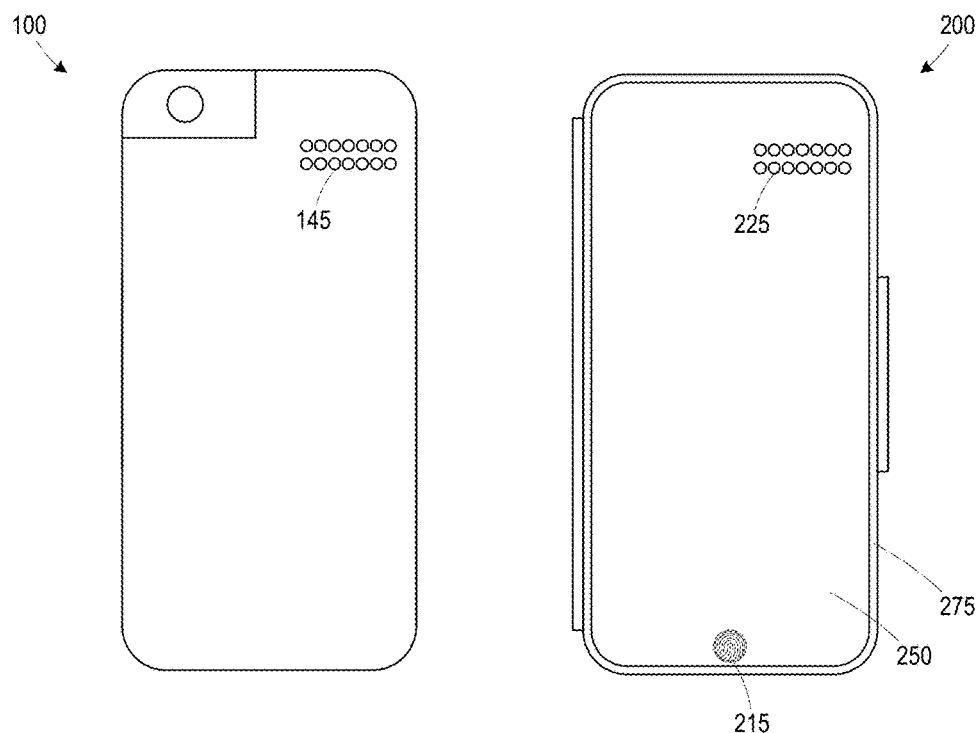
FIG. 3 is a simplified diagram of the interfacing sides of the smart wallet and the mobile device of FIG. 1, according to some embodiments disclosed herein.

FIG. 3 is a simplified diagram of the interfacing faces of the smart wallet 200 and the mobile device of 100 FIG. 1, according to some embodiments disclosed herein. The smart wallet 200 includes a lip 275 that extends over the mobile device 100 to create an interference fit (e.g., similar to a phone protector). When the smart wallet 200 is engaged with the mobile device 100, the connectors 145, 225 mate to allow the security application 160 to detect the docking.

In some embodiments, the biometric sensor 215 of the smart wallet 200 may be located on the interfacing face 250 of the smart wallet 200 such that it is covered up when the smart wallet 200 is docked with the mobile device 100. In such an embodiment, the biometric sensor 215 is physically disabled by preventing access thereto. In other embodiments, the security application 160 may electrically disable the biometric sensor 215 (e.g., by communicating a disable signal to the smart wallet application 230 or via a dedicated disable line in the connector 145).

Figure 4:
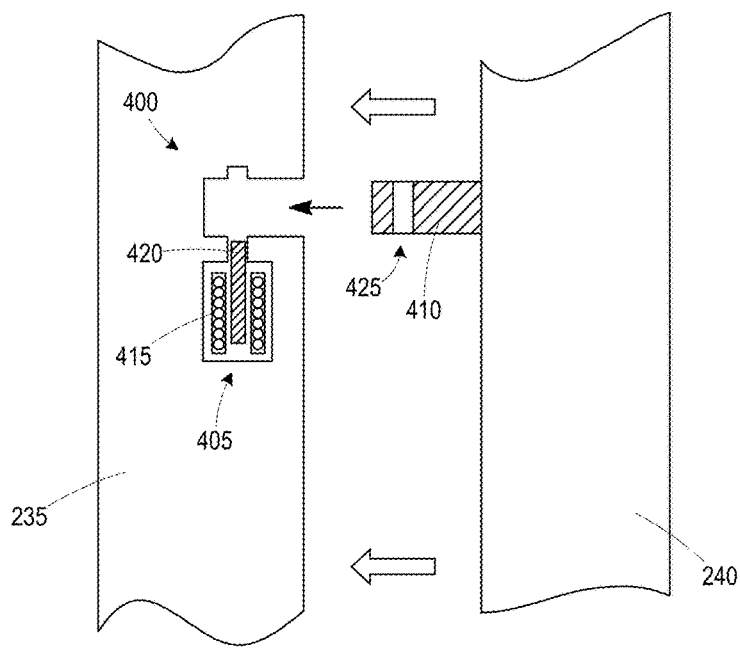
FIG. 4 is diagram of a locking device for securing an enclosure of the smart wallet, according to some embodiments disclosed herein.

FIG. 4 is diagram of a locking device 400 for securing the enclosure 250 of the smart wallet 200, according to some embodiments disclosed herein. The locking device 400 may communicate with the smart wallet application 230 to receive an unlock signal. When the security application 160 controls access to the smart wallet 200, the unlock signal may be sent to the smart wallet application 230 or directly to the locking device 400.

In particular, FIG. 4 shows a cross section view of an example retaining latch system. The locking device 400 system includes a solenoid-actuated latch 405 on the body 235 of the smart wallet 200 and a mating latch plate 410 on the panel 240, although it will be appreciated that these positions may be reversed. The particular location of the locking device 400 on the smart wallet 200 may vary. Moreover, in some embodiments, other types of locking devices may be employed. When the locking device 400 is activated, a solenoid 415 pivots a clasp 420 into an opening 425 in the latch plate 410 on the panel 240. In this manner, the panel 240 is secured to the body 235 until the solenoid 415 retracts the clasp 420. The solenoid 415 and clasp 420 may default to a locked positon if power is absent. The particular location of the locking device 400 on the smart wallet 200 may vary. Moreover, in some embodiments, other types of locking devices may be employed.

FIG. 5 is a flow diagram of a method 500 for interfacing a mobile device with an attached smart wallet, according to some embodiments disclosed herein. In method block 505, engagement of the smart wallet 200 to the mobile device 100 is detected (e.g., based on the interfacing of the connectors 145, 225).

In method block 510, a biometric sensor 215 of the smart wallet 200 is disabled.

In method block 515, an unlock input signal is received and validated on the mobile device 100 (e.g., based on user selection and validation using biometric sensor 140 on mobile device 100). In some embodiments, a list of biometric profiles may be retrieved from the smart wallet 200 and employed by the security application 160 to validate the user's identity.

In method block 520, an unlock signal is sent from the mobile device 100 to the smart wallet 200 responsive to receiving and validating the user input on the mobile device 100.

In method block 525, the contents of the smart wallet 200 may be provided on the display 135 of the mobile device 100. This method block may be executed at any time after the docking is detected.

In method block 530, the contents list is updated based on user interactions (e.g., item extractions or insertions) with the smart wallet 200 via the mobile device 100.

In method block 535, an alert condition is identified based on the contents of the smart wallet 200. In some embodiments, an alert condition may be identified if an item is not returned within a predetermined time interval or if a driving mode is identified and a driver's identification card is not present in the smart wallet 200.

In some embodiments, certain aspects of the techniques described above may be implemented by one or more processors of a processing system executing software. The method 500 described herein may be implemented by executing software on a computing device, such as the processors 115, 205 of FIG. 1, however, such methods are not abstract in that they improve the operation of the mobile device 100 and the smart wallet 200 and the user's experience. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices and the like. The executable instructions stored on the non-transitory computer readable storage medium may be in source code, assembly language code, object code or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

An apparatus includes a smart wallet and a mobile device. The smart wallet includes a first body defining an enclosure, a first biometric sensor, and a first processor to unlock a portion of the first body to allow access to the enclosure responsive to validating a biometric input from the first biometric sensor. The mobile device includes a second body having an attachment interface for removably coupling to the first body and a second processor. The second processor is to send a signal to unlock the portion of the first body based on a user input on the mobile device.

A method includes detecting engagement of a smart wallet to a mobile device. The smart wallet includes a first body defining an enclosure and a first biometric sensor. The first biometric sensor is disabled. An unlock signal is sent from the mobile device to the smart wallet responsive to receiving user input on the mobile device.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. An apparatus, comprising:
   a smart wallet, comprising:
   a first body of the smart wallet defining an enclosure;
   a first biometric sensor on the smart wallet;
   a first processor device to unlock a portion of the first body to allow access to the enclosure responsive to validating a biometric input from the first biometric sensor; and
   a mobile device, comprising:
   a second body having an attachment interface for removably coupling to the first body of the smart wallet;
   detecting engagement of the small wallet to the mobile device by a security application of the mobile device for facilitating control of the smart wallet;
   disabling the first biometric sensor; and
   a second processor device to send a signal to unlock the portion of the first body and allow access to the enclosure based on a user input on the mobile device upon validating a biometric input from the mobile device.

2. The apparatus of claim 1, wherein the second processor device is to disable the first processor device responsive to detecting coupling of the first body to the second body.

3. The apparatus of claim 1, wherein the first body includes a panel and a lock engaging the panel to cover the enclosure, wherein the second processor device is to send a signal to the lock based on the user input.

4. The apparatus of claim 1, wherein the second processor device is to disable the biometric sensor responsive to detecting coupling of the first body to the second body.

5. The apparatus of claim 4, wherein the smart wallet includes a memory to store a set of biometric profiles, the mobile device includes a second biometric sensor, and the second processor device is to retrieve the biometric profiles from the memory and unlock the portion of the first body responsive to validating a biometric input from the second biometric sensor that matches one of the set of biometric profiles.

6. The apparatus of claim 1, wherein the smart wallet includes a memory to store a list of items stored in the enclosure, the mobile device includes a display coupled to the processor, and the second processor device is to retrieve the list of items and display a representation of the items in the list on the display.

7. The apparatus of claim 6, wherein the second processor device is to update the list of items responsive to receiving a user input indicating a removal of one of the items on the list.

8. The apparatus of claim 6, wherein the smart wallet includes a scanning device to detect an insertion or removal of a selected item into the enclosure, and the second processor device is to update the list of items responsive to receiving an input from the scanning device indicating the insertion or removal of the selected item.

9. The apparatus of claim 6, wherein the mobile device includes a motion sensor, and the second processor device is to identify a driving mode based on input from the motion sensor, and send an alert message responsive to determining if a driving identification card is not present in the list of items during the driving mode.

10. The apparatus of claim 1, wherein the smart wallet includes a first connector mounted to the first body and coupled to the first processor, the mobile device includes a second connector to engage the first connector upon coupling of the first body to the second body, and the first and second processor devices are to communicate over a signal path defined by the first and second connectors.

11. The apparatus of claim 1, wherein the smart wallet includes a first transceiver coupled to the first processor, the mobile device includes a second transceiver coupled to the second processor, and the first and second processor devices are to communicate via the first and second transceivers.

12. The apparatus of claim 1, wherein the smart wallet includes a magnetic source, and the second processor is to send a signal to activate the magnetic source responsive to receiving a stolen notification message.

13. The apparatus of claim 1, wherein the first biometric sensor is covered by the second body when the smart wallet is attached to the mobile device.

14. A method, comprising:
  detecting engagement of a smart wallet to a mobile device by a security application of the mobile device for facilitating control of the smart wallet, wherein the smart wallet includes a first body defining an enclosure and a first biometric sensor;
  disabling the first biometric sensor on the smart wallet; and
  sending an unlock signal from the mobile device to the smart wallet and allowing access to the enclosure responsive to receiving user input on the mobile device upon validating a biometric input from the mobile device.

15. The method of claim 14, wherein disabling the first biometric sensor comprises covering the first biometric sensor with a portion of the mobile device when the smart wallet is engaged to the mobile device.

16. The method of claim 14, wherein disabling the first biometric sensor comprises sending a disable signal to the smart wallet responsive to detecting the engagement.

17. The method of claim 14, wherein the smart wallet includes a memory to store a set of biometric profiles, the mobile device includes a second biometric sensor, and the mobile device is to retrieve the biometric profiles from the memory and unlock the smart wallet responsive to validating a biometric input from the second biometric sensor that matches one of the set of biometric profiles.

18. The method of claim 14, wherein the smart wallet includes a memory to store a list of items stored in the enclosure, the mobile device includes a display, and the method further comprises:
  retrieving the list of items from the smart wallet; and
  displaying a representation of the items in the list on the display.

19. The method of claim 18, further comprising updating the list of items on the mobile device responsive to receiving a user input indicating a removal of one of the items on the list.

20. The method of claim 14, wherein the smart wallet includes a scanning device, and the method further comprises detecting an insertion or removal of a selected item into the enclosure, wherein the mobile device is to update the list of items responsive to receiving an input from the scanning device indicating the insertion or removal of the selected item.

* * * * *